US011922777B2

(12) United States Patent
Cuddy et al.

(10) Patent No.: US 11,922,777 B2
(45) **Date of Patent: *Mar. 5, 2024**

(54) ELECTRONIC GAME SYSTEMS AND METHODS WITH A DYNAMIC WHEEL

(71) Applicant: Aristocrat Technologies, Inc., Las Vegas, NV (US)

(72) Inventors: Ryan Cuddy, Reno, NV (US); Lyndsay Berger, Reno, NV (US); Edgar Portigal, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,121

(22) Filed: Dec. 20, 2022

(65) Prior Publication Data

US 2023/0122898 A1 Apr. 20, 2023

Related U.S. Application Data

(63) Continuation of application No. 17/373,266, filed on Jul. 12, 2021, now Pat. No. 11,557,178.

(60) Provisional application No. 63/075,574, filed on Sep. 8, 2020.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3213; G07F 17/3267; G07F 17/34
See application file for complete search history.

(56) References Cited

U.S. PATENT DOCUMENTS

| | | | |
|---|---|---|---|
| 8,246,445 | B2 | 8/2012 | Rodgers |
| 8,460,082 | B2 | 6/2013 | Harris |
| 9,552,698 | B2 | 1/2017 | Berman |
| 9,821,218 | B2 | 11/2017 | Elias |
| 10,535,228 | B2 | 1/2020 | Mariscal |
| 10,621,829 | B2 | 4/2020 | Loader |
| 2010/0153194 | A1 | 6/2010 | Oram |

(Continued)

OTHER PUBLICATIONS

Office Action (Non-Final Rejection) dated Jul. 19, 2022 for U.S. Appl. No. 17/373,266 (pp. 1-8).

(Continued)

*Primary Examiner* — Justin L Myhr
(74) *Attorney, Agent, or Firm* — Armstrong Teasdale LLP

(57) ABSTRACT

An electronic gaming device includes a display device configured to display an electronic game that includes a dynamic wheel feature, a storage device storing a weighted table for the dynamic wheel feature, a processor programmed to: activate the dynamic wheel feature including displaying a wheel where each wheel section identifies an award; display an initial spin of the wheel; provide an initial award value by identifying a first entry in the weighted table indicating an initial award value; remove wheel sections from the displayed wheel that have award values that are less than or equal to the initial award value; perform a second spin of the wheel; and provide a second award value by identifying a second entry in the weighted table based on the third random number and which has an associated award value that is greater than the initial award value.

20 Claims, 10 Drawing Sheets

(56) References Cited

U.S. PATENT DOCUMENTS

| | | | |
|---|---|---|---|
| 2011/0111845 | A1 | 5/2011 | Fitzsimons |
| 2015/0213673 | A1 | 7/2015 | Elias |
| 2019/0026975 | A1 | 1/2019 | Casey |
| 2019/0073875 | A1 | 3/2019 | Loader |

OTHER PUBLICATIONS

Office Action (Notice of Allowance and Fees Due (PTOL-85)) dated Nov. 2, 2022 for U.S. Appl. No. 17/373,266 (pp. 1-7).

ELECTRONIC GAME SYSTEMS AND METHODS WITH A DYNAMIC WHEEL

CROSS-REFERENCE TO RELATED APPLICATIONS

This application is a continuation of and claims priority to U.S. patent application Ser. No. 17/373,266, filed Jul. 12, 2021, which claims the benefit of priority to U.S. Provisional Patent Application No. 63/075,574, filed Sep. 8, 2020, both of which are incorporated herein by reference in their entireties.

TECHNICAL FIELD

The field of disclosure relates generally to electronic gaming, and more particularly to electronic gaming systems and methods with a dynamic wheel feature.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming device is provided. The electronic gaming device includes at least one display device configured to display an electronic game that includes a dynamic wheel feature. The electronic gaming device also includes a storage device storing a weighted table associated with the dynamic wheel feature of the electronic game. The electronic gaming device further includes at least one processor configured to execute instructions stored in at least one memory. The instructions, when executed, cause the at least one processor to: (a) activate the dynamic wheel feature based on an outcome of an instance of the electronic game, the activation includes displaying a wheel that includes a plurality of wheel sections, each wheel section identifies an award that may be awarded during a spin of the wheel; (b) display an initial spin of the wheel based on a first random number generated by a random number generator; (c) provide an initial award value for the initial spin of the wheel by identifying a first entry in the weighted table based on the first random number, the first entry indicating the initial award value; (d) determine to activate the dynamic wheel feature based on a second random number generated by the random number generator; (e) remove wheel sections from the displayed wheel that have award values that are less than or equal to the initial award value; (f) perform a second spin of the wheel based on a third random number generated by the random number generator; and (g) provide a second award value by identifying a second entry in the weighted table based on the third random number and which has an associated award value that is greater than the initial award value.

In another aspect, a method of providing an electronic game with a dynamic wheel feature is provided. The method includes: (a) activating the dynamic wheel feature based on an outcome of an instance of the electronic game, the activation includes displaying a wheel that includes a plurality of wheel sections, each wheel section identifies an award that may be awarded during a spin of the wheel; (b) displaying an initial spin of the wheel based on a first random number generated by a random number generator; (c) providing an initial award value for the initial spin of the wheel by identifying a first entry in the weighted table based on the first random number, the first entry indicating the initial award value; (d) determining to activate the dynamic wheel feature based on a second random number generated by the random number generator; (e) removing wheel sections from the displayed wheel that have award values that are less than or equal to the initial award value; (f) performing a second spin of the wheel based on a third random number generated by the random number generator; and (g) providing a second award value by identifying a second entry in the weighted table based on the third random number and which has an associated award value that is greater than the initial award value.

In yet another aspect, a non-transitory computer readable medium storing instructions is provided. When executed by at least one processor, the instructions cause the at least one processor to: (a) activate the dynamic wheel feature based on an outcome of an instance of the electronic game, the activation includes displaying a wheel that includes a plurality of wheel sections, each wheel section identifies an award that may be awarded during a spin of the wheel; (b) display an initial spin of the wheel based on a first random number number generated by a random number generator; (c) provide an initial award value for the initial spin of the wheel by identifying a first entry in the weighted table based on the first random number, the first entry indicating the initial award value; (d) determine to activate the dynamic wheel feature based on a second random number generated by the random number generator; (e) remove wheel sections from the displayed wheel that have award values that are less than or equal to the initial award value; (f) perform a second spin of the wheel based on a third random number generated by the random number generator; and (g) provide a second award value by identifying a second entry in the weighted table based on the third random number and which has an associated award value that is greater than the initial award value.

In still another aspect, an electronic gaming machine (EGM) is provided. The EGM includes at least one display device configured to display an electronic game that includes a dynamic wheel feature. The EGM also includes a storage device storing a weighted table associated with the dynamic wheel feature of the electronic game. The EGM further includes an EGM processor configured to execute instructions stored in at least one memory that, when executed, cause the EGM processor to at least (a) activate the dynamic wheel feature based on an outcome of an instance of the electronic game, the activation includes displaying a wheel that includes a plurality of wheel sections, each wheel section identifies an award that may be won during a spin of the wheel; (b) perform an initial spin of the wheel based on a first random number generated by a random number generator; (c) provide an initial award amount by identifying a first entry in the weighted table based on the first random number, the first entry indicating the initial award amount; (d) determine to activate the dynamic wheel feature based on a second random number generated by the random number generator; (e) remove wheel sections from the displayed wheel that are less than or equal to the initial award amount; (f) remove entries from the weighted table that are less than or equal to the initial award amount; (g) perform a second spin of the wheel based on a third random number generated by the random number generator; and (h) provide a second award amount by identifying a second entry in the weighted table based on the third random number.

In yet another aspect, a gaming system is provided. The gaming system includes an electronic gaming device having at least one display device configured to display an electronic game that includes a dynamic wheel feature. The gaming system also includes a server computing device. The server computing device includes a storage device storing a weighted table associated with the dynamic wheel feature of the electronic game. The server computing device also includes at least one processor configured to execute instructions stored in at least one memory that, when executed, cause the at least one processor to at least: (a) activate the dynamic wheel feature based on an outcome of an instance of the electronic game, the activation includes causing the electronic gaming device to display a wheel that includes a plurality of wheel sections, each wheel section identifies an award that may be won during a spin of the wheel; (b) perform an initial spin of the wheel based on a first random number generated by a random number generator; (c) cause the electronic gaming device to provide an initial award amount by identifying a first entry in the weighted table based on the first random number, the first entry indicating the initial award amount; (d) determine to activate the dynamic wheel feature based on a second random number generated by the random number generator; (e) cause the electronic gaming device to remove wheel sections from the displayed wheel that are less than or equal to the initial award amount; (f) remove entries from the weighted table that are less than or equal to the initial award amount; (g) perform a second spin of the wheel based on a third random number generated by the random number generator; and (h) cause the electronic gaming device to provide a second award amount by identifying a second entry in the weighted table based on the third random number.

In still yet another aspect, a method of providing an electronic game with a dynamic wheel feature is provided. The method is performed using an electronic gaming devices having a at least one display device configured to display an electronic game that includes a dynamic wheel feature, a storage device storing a weighted table associated with the dynamic wheel feature of the electronic game, and an EGM processor. The method includes: (a) activating the dynamic wheel feature based on an outcome of an instance of the electronic game, the activation includes displaying a wheel that includes a plurality of wheel sections, each wheel section identifies an award that may be won during a spin of the wheel; (b) performing an initial spin of the wheel based on a first random number generated by a random number generator; (c) providing an initial award amount by identifying a first entry in the weighted table based on the first random number, the first entry indicating the initial award amount; (d) determining to activate the dynamic wheel feature based on a second random number generated by the random number generator; (e) removing wheel sections from the displayed wheel that are less than or equal to the initial award amount; (f) removing entries from the weighted table that are less than or equal to the initial award amount; (g) performing a second spin of the wheel based on a third random number generated by the random number generator; and (h) providing a second award amount by identifying a second entry in the weighted table based on the third random number.

In yet another aspect, a non-transitory computer readable medium storing instructions is provided. The instructions, when executed by at least one processor, cause the at least one processor to: (a) activate a dynamic wheel feature of an electronic game based on an outcome of an instance of the electronic game, the activation includes displaying a wheel that includes a plurality of wheel sections, each wheel section identifies an award that may be won during a spin of the wheel; (b) perform an initial spin of the wheel based on a first random number generated by a random number generator; (c) provide an initial award amount by identifying a first entry in a weighted table based on the first random number, the first entry indicating the initial award amount; (d) determine to activate the dynamic wheel feature based on a second random number generated by the random number generator; (e) remove wheel sections from the displayed wheel that are less than or equal to the initial award amount; (f) remove entries from the weighted table that are less than or equal to the initial award amount; (g) perform a second spin of the wheel based on a third random number generated by the random number generator; and (h) provide a second award amount by identifying a second entry in the weighted table based on the third random number.

DETAILED DESCRIPTION

Electronic gaming devices, systems and methods are described herein that provide a dynamic wheel feature in an electronic game. An electronic gaming device (EGM) may initiate a dynamic wheel feature during base game play. The dynamic wheel feature includes multiple wheel slices or sections, each of which includes an award that can be won during a spin of the wheel. After an initial spin of the wheel and resulting award determination, the EGM may activate a dynamic wheel feature that removes all wheel sections from the wheel that are less than or equal to the initially awarded section. The player may then be awarded one or more additional spins on this enriched wheel, where the subsequent spin result is higher than the previous award. As such, the wheel provides enhanced anticipation at the prospect of a higher award on a subsequent spin.

Figure 1:
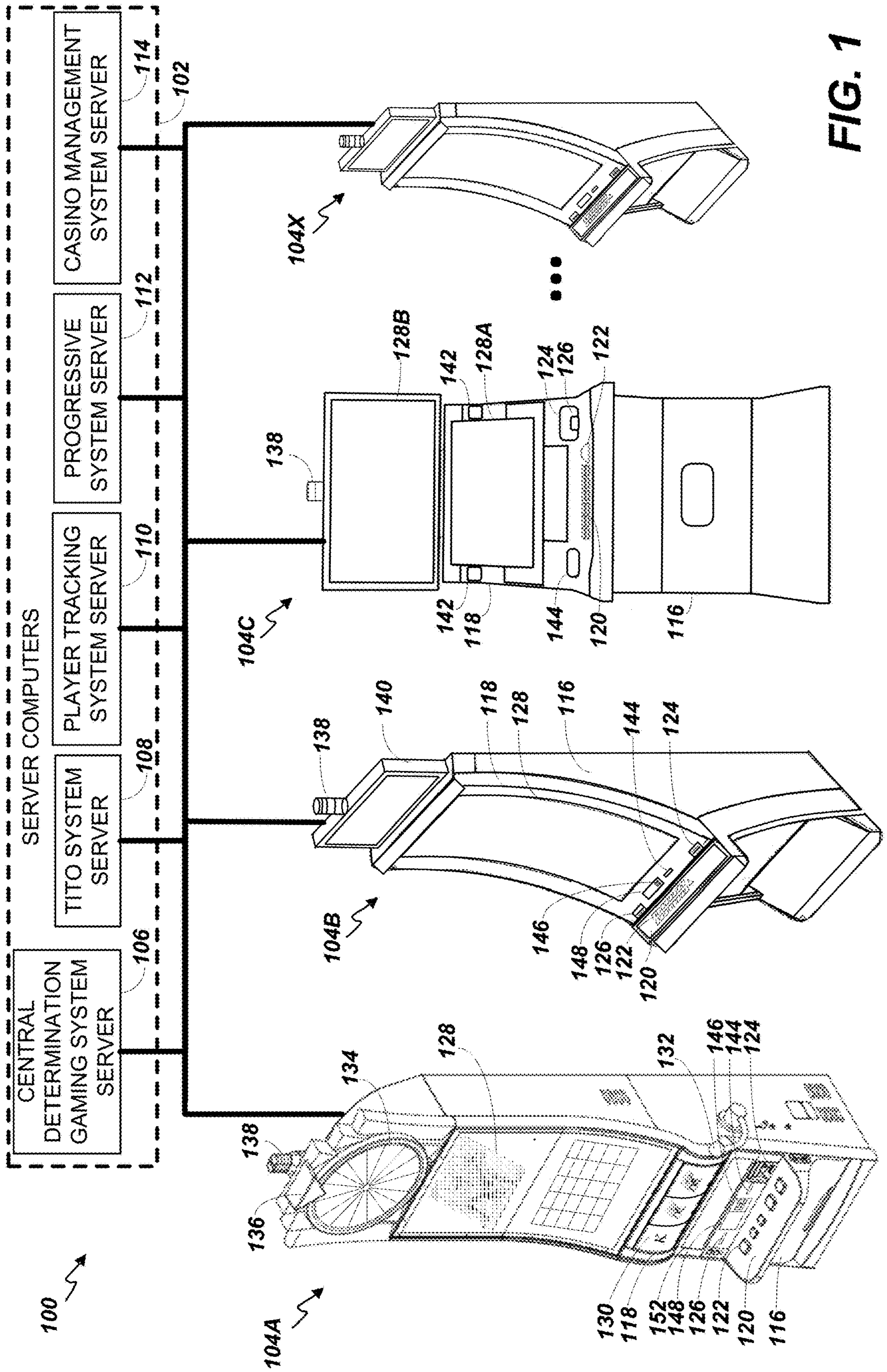
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
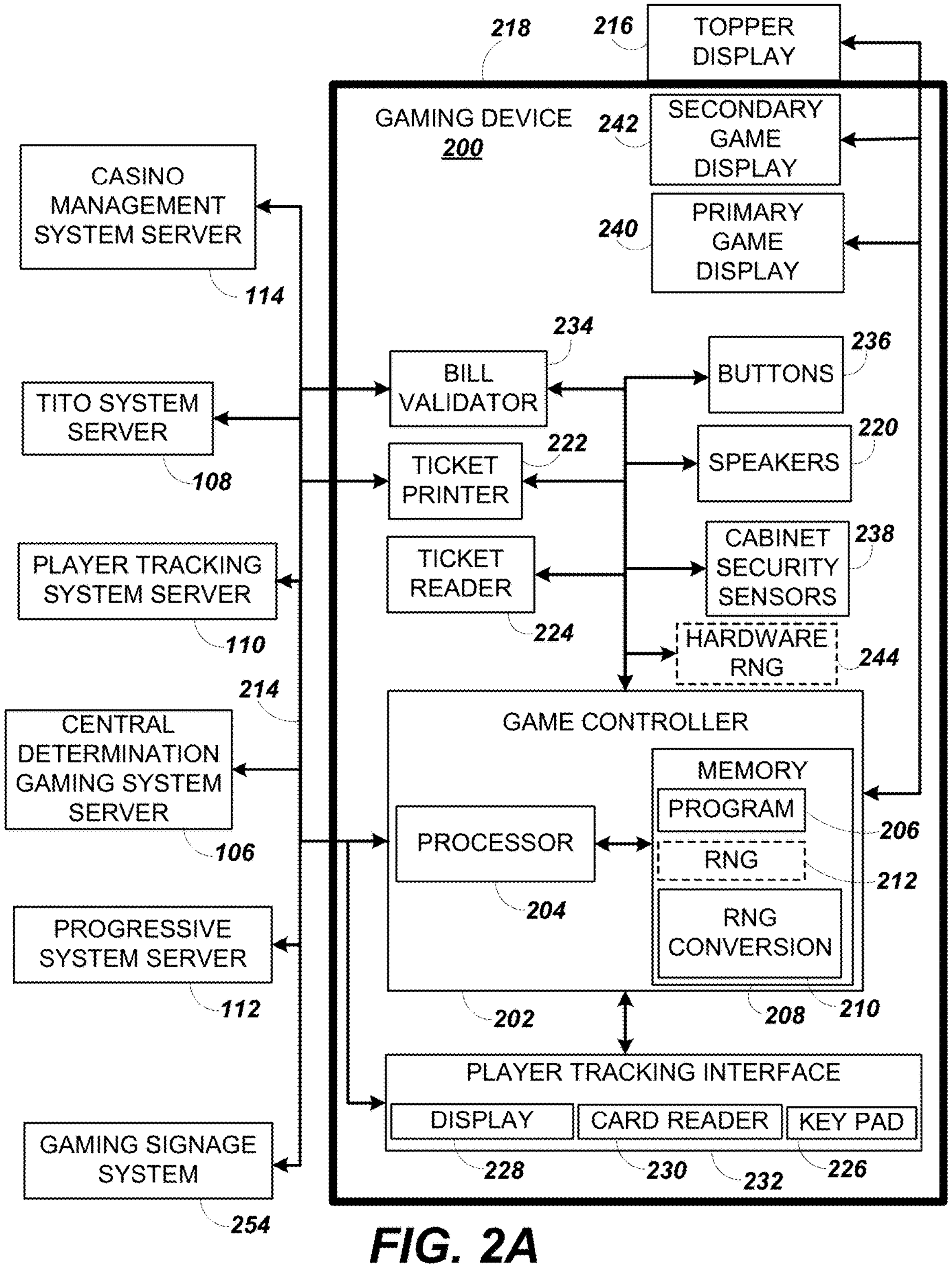
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Although gaming devices 104A-104X are shown in FIG. 1 as upright EGMs, the systems and methods described herein can be used on upright EGMs or table type EGMs as shown in FIG. 4.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In an example embodiment, a tabletop EGM (not shown in FIG. 1) is provided which may be similar to the gaming devices 104. The tabletop EGM may include a horizontal display device that can be used by patrons as a conventional table surface as well as for providing player input (e.g., touchscreen surface, mechanical buttons, or the like) and display output (e.g., virtual wheel, virtual slot reels) for a tabletop game. The tabletop EGM may support participation for multiple players during game play (e.g., as patrons socially meet around the tabletop EGM). Example tabletop EGMs and features are described in greater detail below.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
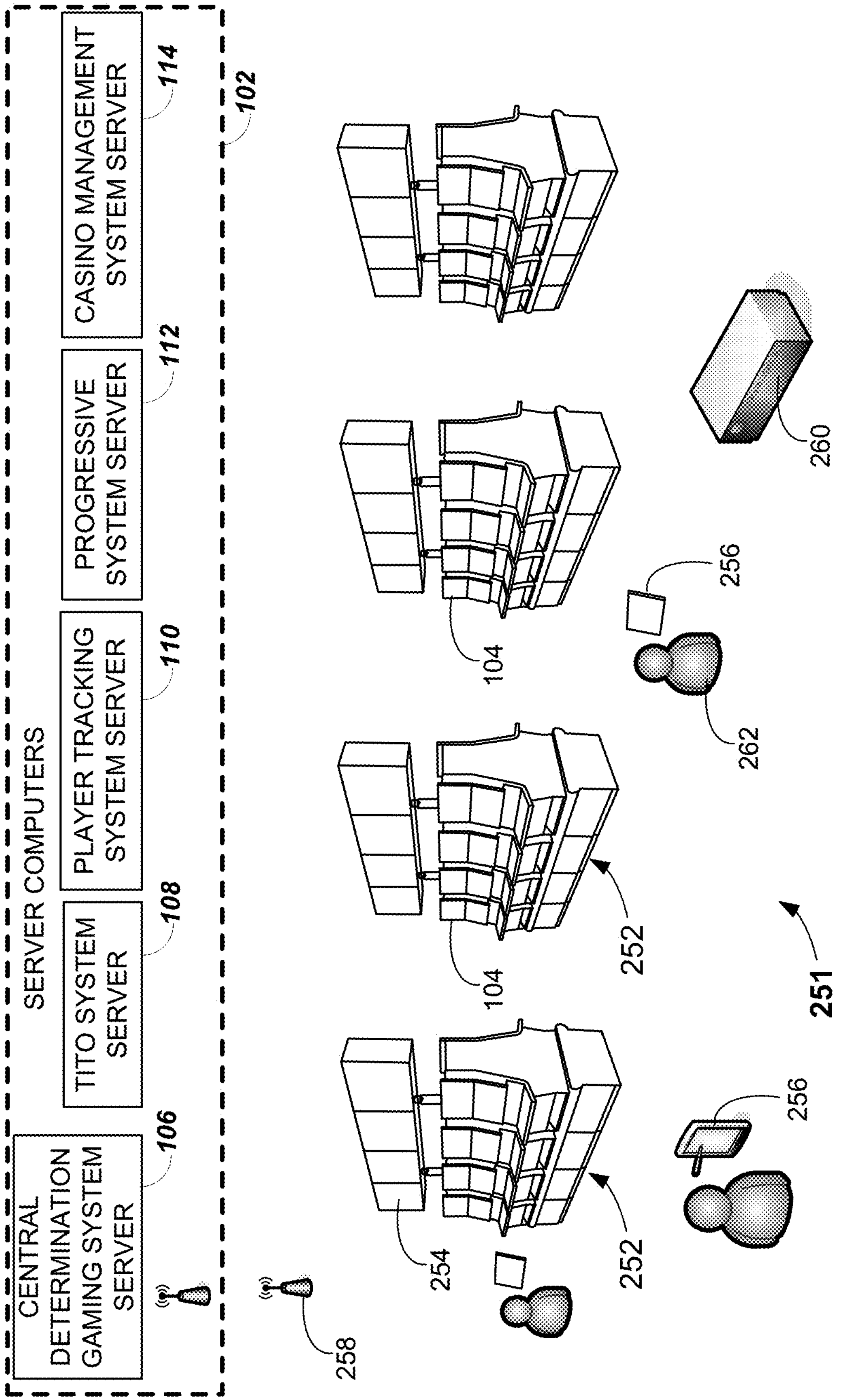
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
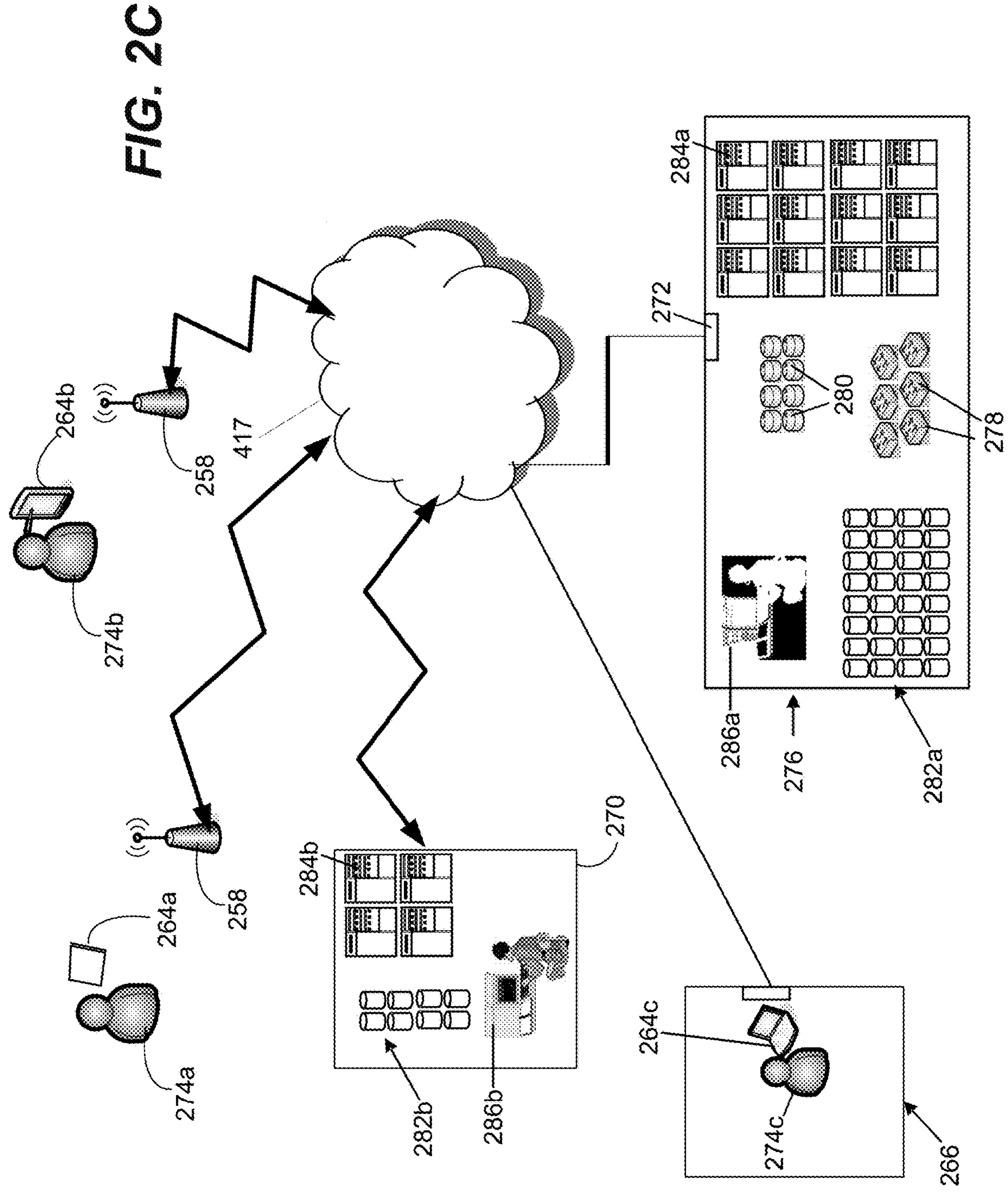
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
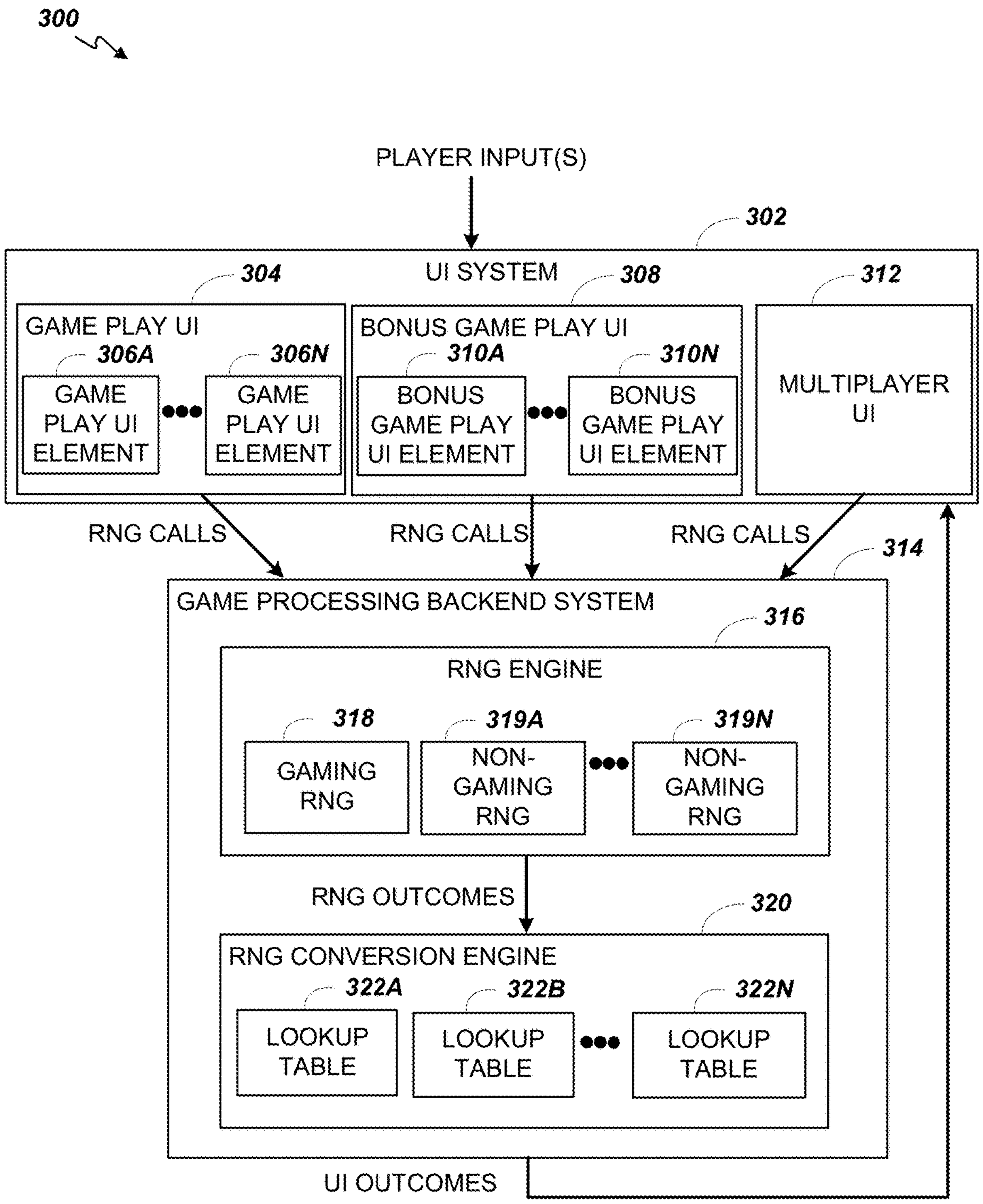
FIG. 3 illustrates, in block diagram form, an embodiment of a game processing architecture algorithm that implements a game processing pipeline for the play of a game in accordance with various embodiments described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIGS. 4A-4D illustrate example screenshots 410, 420, 430, 440 of a dynamic wheel 404 provided as a feature (or "feature game") of an example electronic game that may be provided by the EGMs 104, 200 shown in FIGS. 1-3. In the example embodiment, the electronic game includes a slot-style reel game (a "base game," not shown) that utilizes mechanical or virtual reels, spinning and stopping those reels during base game play and evaluating the outcome of the spin to determine an outcome. During play of the base game, an example dynamic wheel feature shown in FIGS. 4A-4D may be activated (e.g., based on spin outcome shown on the reels, based on RNG output, or the like). For example, the feature game may be activated by the appearance of three or more feature game symbols appearing on any active payline, as a three-of-a-kind or better in a ways evaluation, or appearing anywhere in the spin result.

Figure 4A:
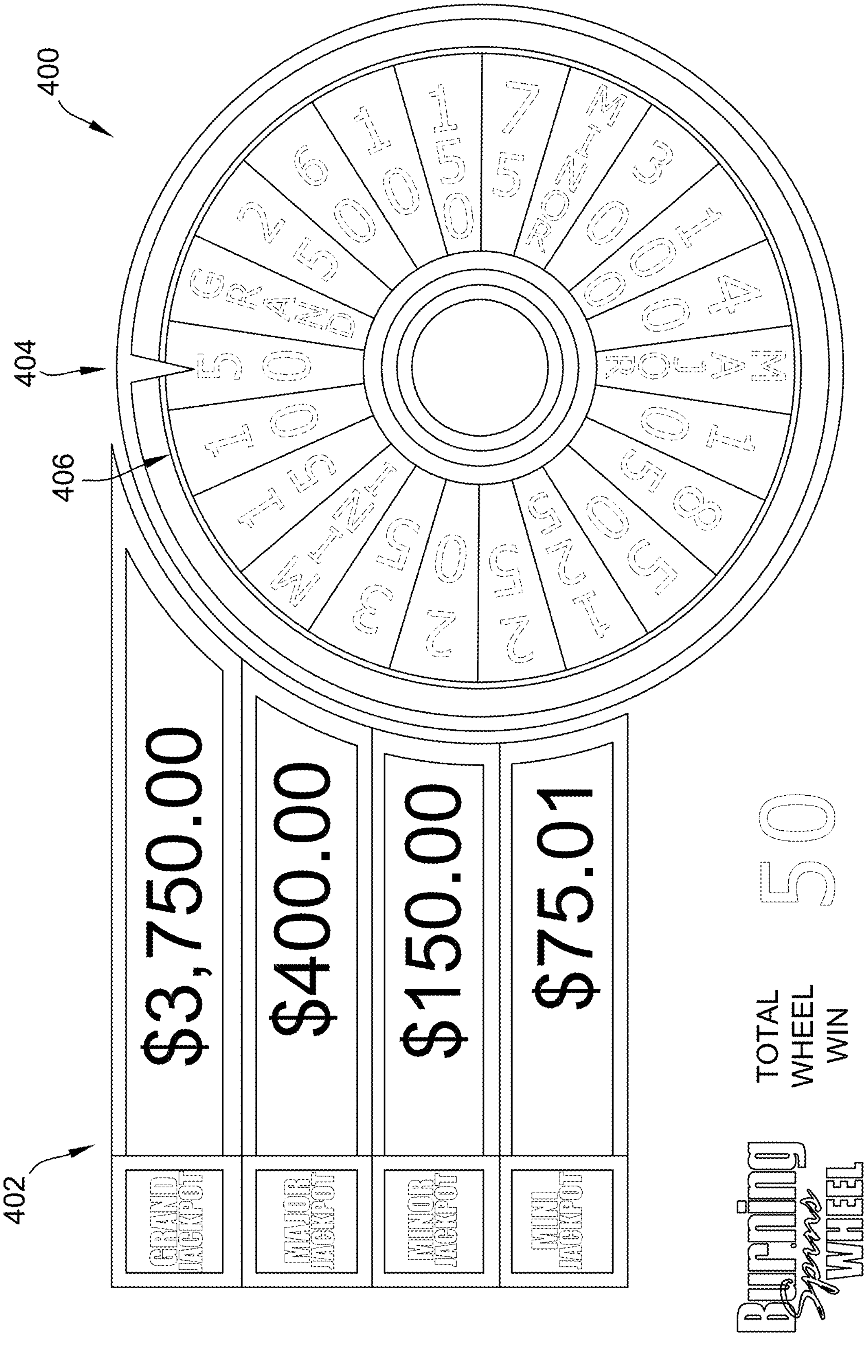
FIGS. 4A-4D illustrate example screenshots of a dynamic wheel provided as a feature of an example electronic game that may be provided by the EGMs shown in FIGS. 1-3.

FIG. 4A is a first example screenshot 400 of the dynamic wheel 404 during initiation of the feature game on a graphical interface 402. The dynamic wheel 404 includes numerous wheel "slices" or "sections" 406, each of which identifies a particular prize (e.g., a number of credits, a jackpot prize, a progressive jackpot, or the like) that may be won when the wheel is spun. In these example embodiments, the dynamic wheel 404 is provided as digital video output presented on a display device such as the primary game display 240 or secondary game display 242 shown in FIG. 2A. In other embodiments, the EGM 104 may provide a rotating mechanical wheel and stepper motor assembly with digital video display surface(s) that allow the modifications of the wheel 404 or wheel sections 406 such as to allow the embodiments described herein.

When the feature game is initially activated, the EGM 104 presents the wheel 404 as complete, with each of the wheel sections 406 identifying a particular prize. During initial activation, the player is awarded one or more spins of the wheel 404. In some embodiments, the spin(s) of the wheel 404 may be automatically conducted, displayed, and resolved, awarding a prize for each spin of the wheel 404. In this example embodiment, the player is awarded a single spin and FIG. 4A illustrates the results of that initial spin, resulting in a 50-credit award.

Figure 4B:
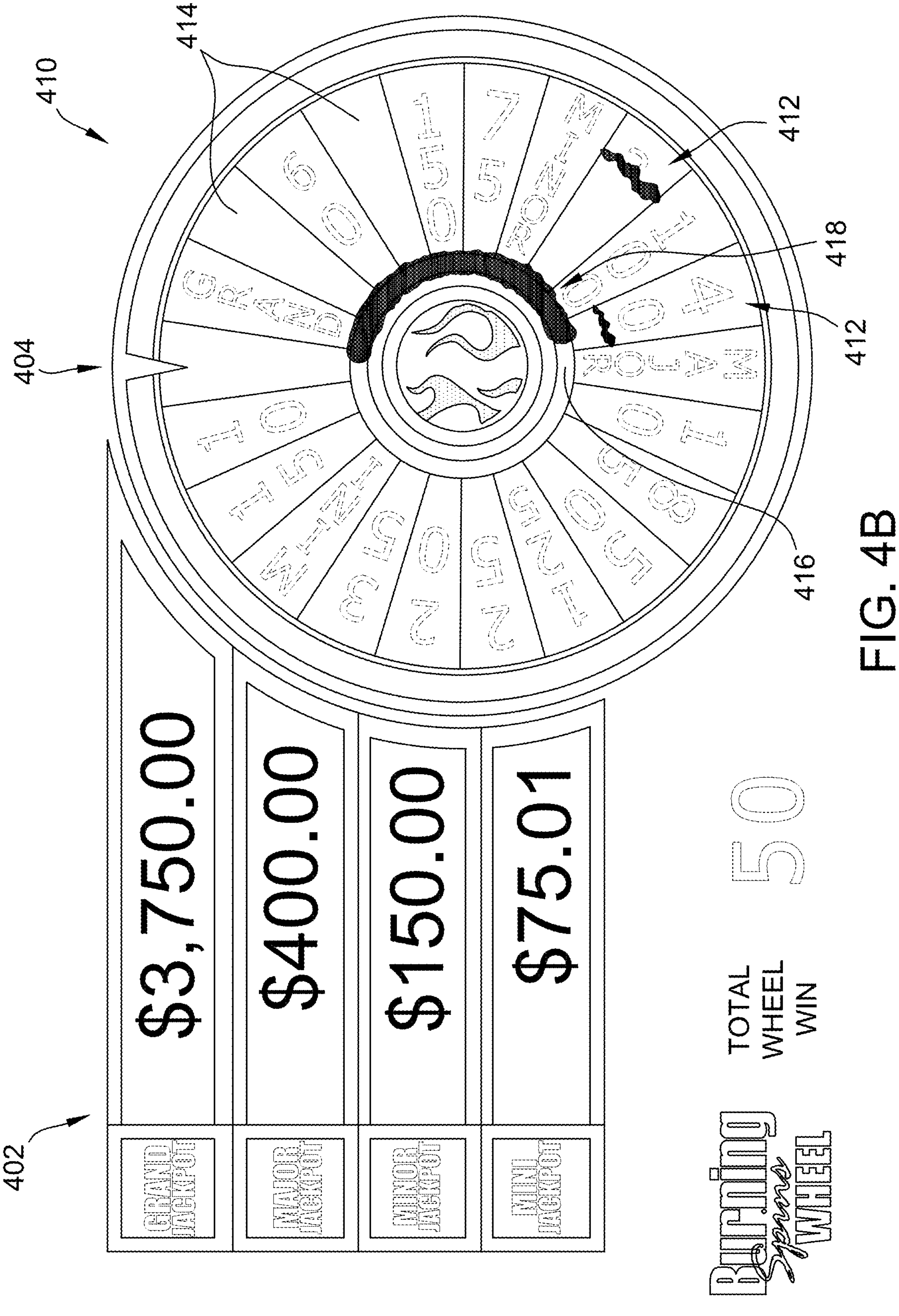

FIG. 4B is a second example screenshot 410 of the feature game during activation of the dynamic wheel feature. In the example embodiment, the feature game may activate the dynamic wheel feature, which may change the wheel 404 and award one or more additional spins. This dynamic wheel feature may be referred to herein as "Burning Spins Wheel." In the example embodiment, after the initial spin, the EGM 104 determines whether or not to activate the dynamic wheel feature and award an additional spin. For example, the EGM 104 may draw a random number (e.g., via the RNG 212) and may activate the dynamic wheel feature based on the random number (e.g., via a pre-determined threshold, which may be static, based on a wager amount, or may be a dynamic threshold based on a number of free spins already awarded, the wager amount, the number of remaining active wheel sections 406, or any combination thereof).

The dynamic wheel feature, in the example embodiment, includes dynamic modification of the wheel 404 based on the most recent spin result. When the feature game awards an additional spin (e.g., after resolution, display, and evaluation of a first or prior spin), the feature game activates a dynamic wheel feature that changes the wheel 404 for the next spin. More specifically, any of the wheel sections 406 that have an assigned credit value equal to or less than the prior wheel spin result are removed from the wheel 404 when an additional spin of the wheel 404 is awarded to the player. In this example, the initial wheel spin resulted in a credit value of 50 credits (e.g., as shown in FIG. 4A) and, upon determining that the dynamic wheel feature is activated, the EGM 104 removes all wheel sections 406 less than or equal to 50 credits.

In the example embodiment, the dynamic wheel feature includes a burning wheel display animation that serves to illustrate this dynamic wheel feature to the player. More specifically, and as shown in FIG. 4B, the wheel 404 includes in interior circle 416 that begins a burning animation which will burn away any wheel sections 406 that are equal to or less than the prior spin result (e.g., less than or equal to 50 credits) before the next spin is provided to the player. The burning animation includes a burn indicator 418 that travels around the interior circle 416 (e.g., clockwise, starting at the previous spin result). As the burn indicator 418 touches a wheel section 406 that has a credit value equal to or less than the prior spin result, that section 406 undergoes a section burn animation (e.g., from interior to exterior of the wheel 404). FIG. 4B illustrates two burning sections 412 as they appear during the section burn animation for that section, where the section burn progresses starting from the burn indicator 418 (e.g., as the burn indicator 418 animation passes by sections 412) and progresses outward to the edge of the wheel 404. After sections are burnt and removed from the wheel 404, the sections that were burned away subsequently appear as inactive sections 414 (e.g., displaying no credit value), thereby visually identifying those sections 414 as inactive during subsequent spins.

Figure 4C:
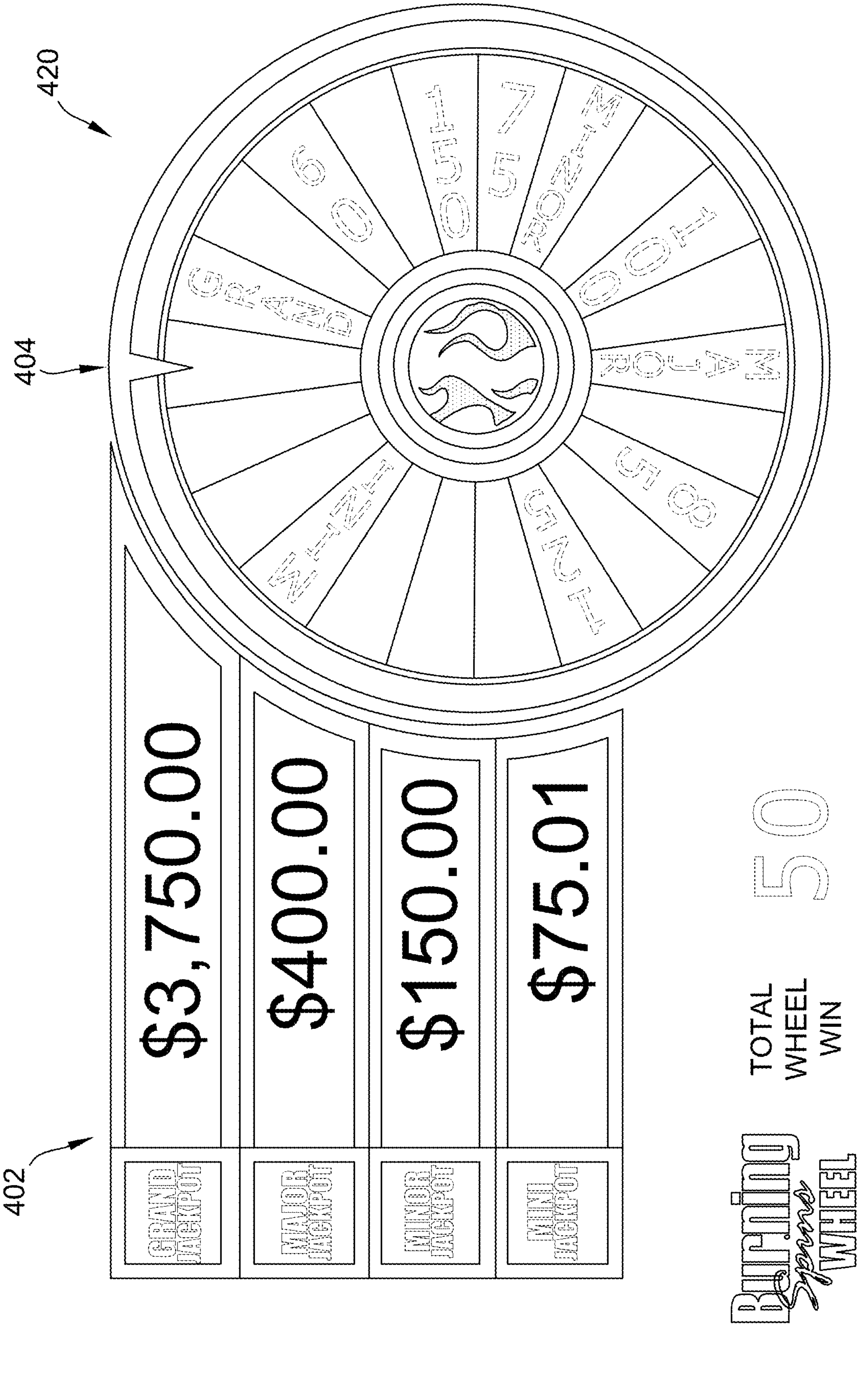

FIG. 4C is a third example screenshot 420 of the first spin of the feature game after removal of all 50-credit or less sections 406 (e.g., after the burn indicator 418 has travelled completely around the interior circle 416 and completed all section burn animations). As shown in FIG. 4C, the state of the wheel 404 for the next spin includes only sections 406 with credit values greater than 50 credits. In the example embodiment, when the player is awarded the dynamic wheel feature after a prior spin, the wheel burning is displayed as described above and the player is awarded a spin of the resulting wheel 404 (e.g., the wheel 404 as shown in FIG. 4C).

Figure 4D:
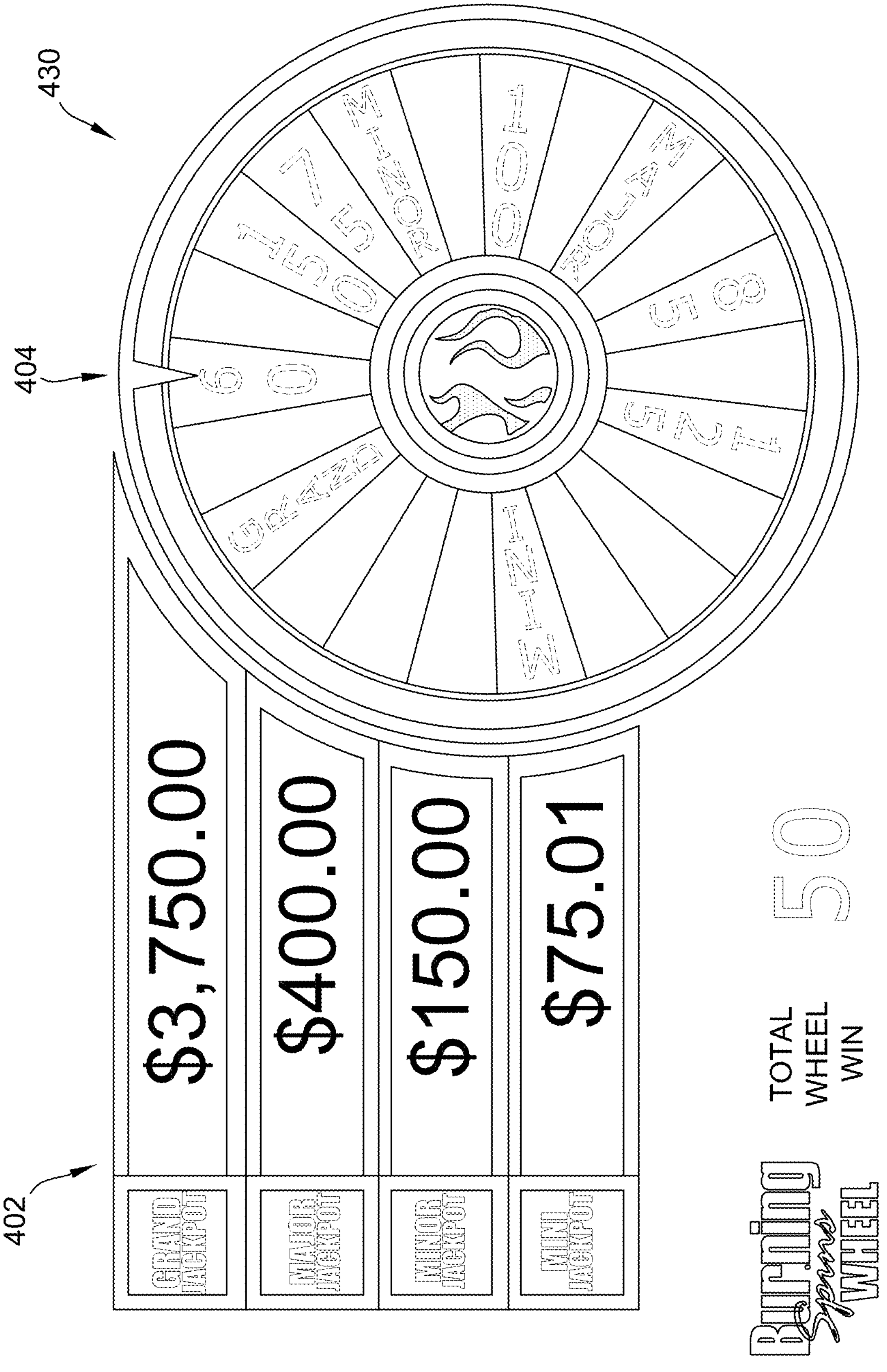

FIG. 4D is a fourth example screenshot 430 of the feature game after a second spin of the wheel 404 as described above, but without processing another burning animation. In this example, the second spin results in a 60-credit win but the player is not awarded another spin of the wheel 404. As such, no burning animation is performed. The EGM 104 may continue to determine whether or not to activate the dynamic wheel feature again after the second spin as described above. If the dynamic wheel feature is not activated, the feature game may be concluded and the player awarded any won amount(s).

Figure 5:
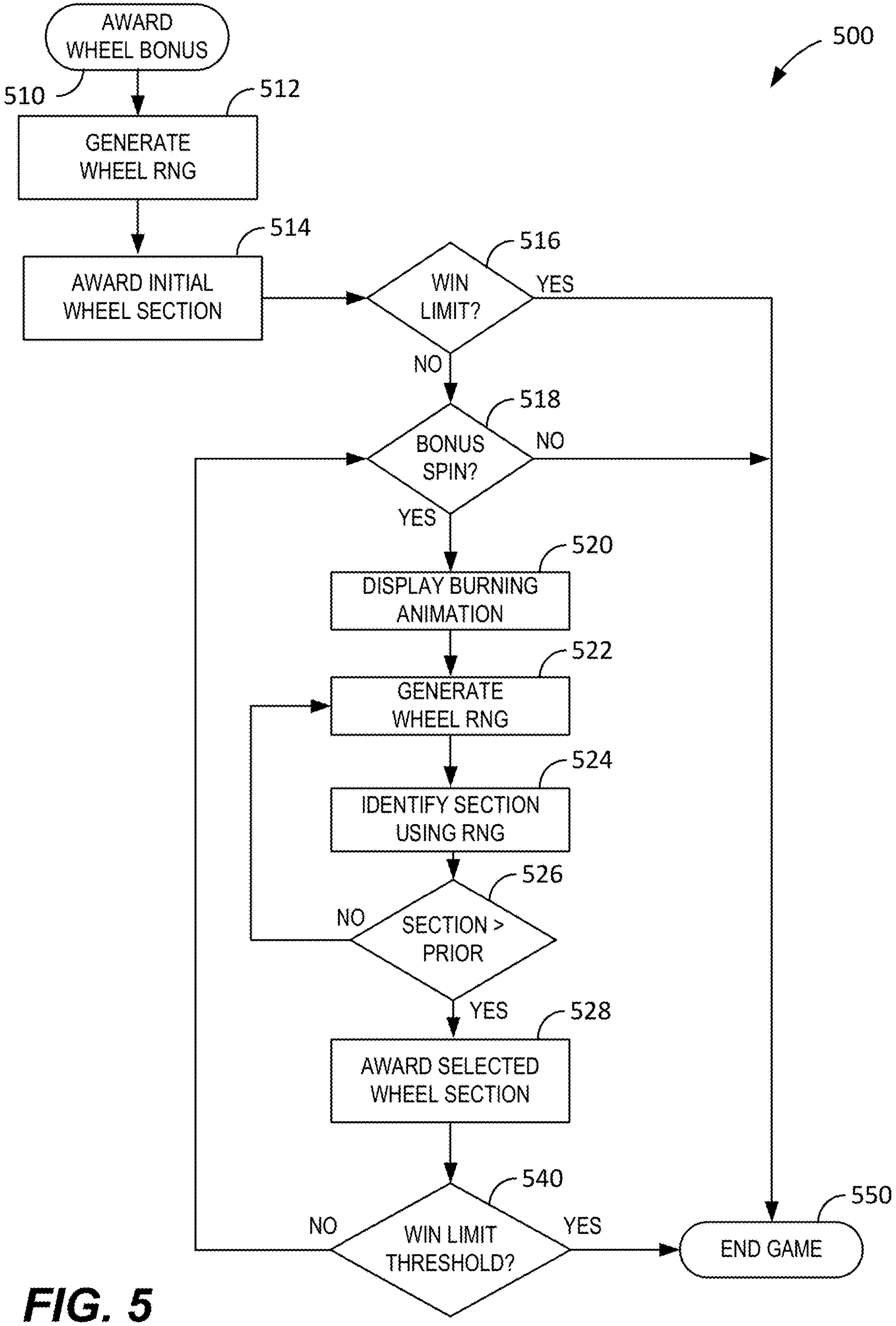
FIG. 5 is a flowchart of a method for providing a dynamic wheel feature.

FIG. 5 is a flowchart of a method 500 for providing a dynamic wheel feature. In the example embodiment, the method 500 is provided by an electronic game executing on the EGM 104 or gaming device 200 shown in FIGS. 1-3, and may be similar to the feature game illustrated and described in relation to FIGS. 4A-4D. In other embodiments, the method 500 may be provided on a gaming device (e.g., a personal gaming device, a mobile gaming device 256, an EUD 264, a personal computer, or the like). In the example embodiment, the method 500 includes awarding a wheel bonus at operation 510 (e.g., the dynamic wheel feature game described above) based on an outcome (e.g., evaluation of a spin result) of a base game (not shown). A random number is generated at operation 512 to determine which section of the wheel 400 to award for an initial wheel spin. The EGM 104 may utilize a weighted table in conjunction with the random number to determine the spin results. For example, the following pay table may be used to resolve wheel spin outcomes:

```
<weighttable name="WheelTable1" type="string">
  <weightentry count="1" value="0|P1" />
  <weightentry count="450" value="1|50" />
  <weightentry count="1150" value="2|10" />
  <weightentry count="1150" value="3|15" />
  <weightentry count="120" value="4|P4" />
  <weightentry count="1050" value="5|35" />
  <weightentry count="3000" value="6|20" />
  <weightentry count="1500" value="7|25" />
  <weightentry count="100" value="8|125" />
  <weightentry count="450" value="9|50" />
  <weightentry count="154" value="10|85" />
  <weightentry count="1150" value="11|10" />
  <weightentry count="4" value="12|P2" />
  <weightentry count="525" value="13|40" />
  <weightentry count="150" value="14|100" />
  <weightentry count="1050" value="15|30" />
  <weightentry count="16" value="16|P3" />
  <weightentry count="180" value="17|75" />
  <weightentry count="70" value="18|150" />
  <weightentry count="1150" value="19|10" />
  <weightentry count="180" value="20|60" />
  <weightentry count="1500" value="21|25" />
</weighttable>
```

In the above example weighted table <weighttable>“WheelTable1,” each wheel section 406 includes an associated <weightentry> element in the <weighttable>. Within each <weightentry>, the “count” is the weight for this entry (e.g., representing a chance of this particular wheel section being identified by the generated random number) and the “value” can be generally represented as “A|B”, where “A” is a unique index number of the particular wheel section 406 of the wheel 404 and “B” is the award of that wheel section 406 (e.g., a numerical number of credits or a progressive identifier for one of four progressive jackpots available on this EGM 104). For example, and using FIGS. 4A-4D with the above weighted table, the entries in the weighted table begin with the “grand” jackpot as the first entry (e.g., value=“0|P1”, namely, section “0” and the “P1” jackpot) and numbering the sections in counter-clockwise order. As such, in the example shown in FIG. 4A, the initial random number chosen upon activation of the wheel feature (e.g., at operation 512) indicates section “1” with a credit value of “50”. Initially, the EGM 104 may create a copy of the example weighted table (e.g., from a complete copy in memory) and may modify the “working copy” of this table as this method 500 progresses (e.g., potentially modifying or deleting rows from the table). In some embodiments, the weight table may additionally be used to determine how to display the wheel 404 shown to the player (e.g., in what relative order the sections 406 are presented on the wheel 404).

At operation 514, the EGM 104 uses the weighted table and the selected RNG to identify and award a section of the wheel as an outcome of the initial spin. In this example, and mirroring the wheel outcome shown in FIG. 4A, the index entry #1, <weightentry count=“450” value=“1|50”/>, is selected based on the RNG result. As such, the EGM 104 simulates a spin of the wheel, with the spin landing on the entry #1 section having an award value of 50 credits. The award value of 50 credits is provided to the player. In the example embodiment, the dynamic wheel feature includes a win limit threshold, such as a pre-determined credit value, that is used to deactivate any further activation of the dynamic wheel feature. For example, the EGM 104 may be preconfigured with a win limit threshold of 100 credits or 200 credits. As such, if this instance of the dynamic wheel feature has awarded 100 credit or more (e.g., from the initial spin and any subsequent spins during this instance), the method may automatically not activate the dynamic wheel feature. More specifically, at test 516, if the initial award equals or exceeds the win limit threshold, the feature game may be ended at operation 550.

If the initial award does not exceed the win limit threshold at test 516, then the method 500 proceeds to determine whether or not to activate the dynamic wheel feature. In the example embodiment, the dynamic wheel feature and accompanying burning animations are only activated when a subsequent bonus spin is awarded to the player. At test 520, the method 500 includes determining whether or not to award a bonus spin to the player 520. In some embodiments, the test 520 may include generating another random number and comparing that outcome to a pre-determined threshold (e.g., a fixed percentage) to determine whether or not to award an additional free spin to the player. In the example embodiment, the EGM 104 uses the following bonus spin weighted table:

```
<weighttables
xmlns="http://abcdefg.com/BonusRespinWeightTables.xsd">
  <weighttable type="int" name="BSRespin_1">
    <weightentry value="1" count="1"/>
    <weightentry value="0" count="1"/>
  </weighttable>
  <weighttable type="int" name="BSRespin_2">
    <weightentry value="1" count="2"/>
    <weightentry value="0" count="3"/>
  </weighttable>
  <weighttable type="int" name="BSRespin_3">
    <weightentry value="1" count="2"/>
    <weightentry value="0" count="3"/>
  </weighttable>
  <weighttable type="int" name="BSRespin_4">
    <weightentry value="1" count="1"/>
    <weightentry value="0" count="3"/>
  </weighttable>
  <weighttable type="int" name="BSRespin_5">
    <weightentry value="1" count="1"/>
    <weightentry value="0" count="3"/>
  </weighttable>
</weighttables>
```

In this example, the bonus respin weighted tables provide for five potential respins for the dynamic wheel feature, where each round of respin determination has a separate weight table having a set of weighted entries that is used to configure and control the probability of respin activation during that particular round of the feature game. More specifically, the BonusRespinWeightTables includes five <weighttable> entries named “BSrespin_#”, where “#” is the number of rounds (or number of wheel spins) already provided during this instance of the feature game. Each “BSRespin_#”<weighttable> includes two entries (“<weightentry>”), one having a value=“1” (e.g., indicating a successful award of another spin), and another having a value=“0” (e.g., indicating an unsuccessful award of another spin). Further, each <weightentry> also includes a count=“/ V”, where N is a weight associated with that entry and relative to the total counts of all entries in that table. After the example initial spin and award of 50 credits as shown in FIG. 4A, the EGM 104 may increment a spin counter from zero to 1 (e.g., as having awarded one spin outcome), and may then identify the “BSRespin_1” weighted table to use during test 520 (e.g., using another RNG output). Using this example set of weighted tables, for example, the player has a 1 in 2 chance of being awarded a bonus spin after the first spin, a 2 in 5 chance after the second spin and third spin, and a 1 in 4 after the fourth spin and fifth spin. It should be understood that the number of rounds and their associated weighted chances are exemplary and may differ.

If, at test 518, no bonus spin is awarded, then the feature game may be ended at operation 550.

If a bonus spin is awarded at test 518, then the method 500 includes modifying the wheel and selecting and awarding another wheel section that is greater than the prior awarded section. More specifically, at operation 520, the EGM 104 modifies the wheel by displaying the burning animation as described with respect to FIGS. 4A-4D (e.g., visually removing all of the wheel sections 406 that are less than or equal to the awarded section.) For example, each of the sections 406 that are less than or equal to 50 credits are shown to burn away as the burn indicator 418 traverses the interior circle 416 of the wheel 404. At operation 522, the EGM 104 proceeds with processing the next spin result. More specifically, the EGM 104 generates another random number for the next wheel spin at operation 522. At operation 524, that random number is used to select a section for this spin by identifying another entry from the weighted table <weighttable>"WheelTable1." In the example embodiment, if, at test 526, the selected section is not greater than the prior awarded section, then the method 500 returns to operation 522, discards that RNG, and selects a new entry with a new RNG (e.g., until a section with an award value that is greater than the award value of the previous spin result). In some scenarios, the weighted table may not be an editable data structure (e.g., due to regulatory controls) and, as such, the method 500 may include returning through operations 522 and 524 until a greater slice is identified (e.g., without modifying the table). In another embodiment, lesser sections may be removed from the weighted table before selecting a new section. This operational loop continues until an entry is selected that has an award amount that exceeds the prior award amount.

Once test 526 verifies that a wheel section 406 with an award amount larger than the previous award amount has been identified, the method 500 includes awarding the selected section to the player at operation 528 (e.g., cumulatively with, or as an alternative to, the prior award amount(s)). At test 540, if the award amount(s) exceed the win limit threshold after awarding this section, then the feature game may be ended at operation 550. If, however, at test 540, the award amount(s) do not yet exceed the win limit threshold after awarding this section, then the method 500 returns to test 520 and may determine whether or not to reactivate the dynamic wheel feature and award another free spin. If the dynamic wheel feature is reactivated, then the current state of the modified wheel and weighted table may continue to be used. In other words, the sections that were removed by any prior feature spins may continue to be inactive and may continue to appear as removed from the wheel.

In some embodiments (e.g., in situations where the weighted table is not editable), the EGM 104 may maintain a wheel state table that tracks the current state of the wheel 404 and that is used to determine how the current state of the wheel 404 is presented. For example, the EGM 104 may begin with a wheel state table that has all of the sections included in the weighted table used for spin resolutions. The EGM 104 may edit the wheel state table after any wheel section 406 is awarded (e.g., at operations 514, 528), marking the awarded section and lesser-valued sections as empty, burned away, zero value, or the like. Such sections are still displayed on the wheel 404, but are shown without any award value (e.g., as shown in FIGS. 4C and 4D). The EGM 104 may use this wheel state table to render the wheel 404 without making changes to the weight table for the wheel 404. In other embodiments, the EGM 104 may track a highest prior award value and may determine how to render the current state of the wheel using the weight table in conjunction with the highest prior award value. More specifically, the EGM 104 may render all wheel sections 406 of the wheel 404, and their associated award values, that have award values that are greater than the highest prior award value, and the EGM 104 may render any wheel sections 406 as blank or empty wheel sections 406 for those wheel sections 406 that have an associated award value that is less than or equal to the highest prior award value. Since the method 500 discards or otherwise does not populate any sections with award values equal to or less than the prior awarded section (e.g., having the highest prior award value), the editing of the state table for the wheel 404 should effectively maintain the sections available to be won based on discarding of any lesser spin results in operations 522-526. As such, a subsequent spin result generates an award greater than the previous award since all sections that were less than or equal to the previous award have been removed from the wheel 404. This repeated dynamic alteration of the wheel 404 provides heightened anticipation and greater awards as the feature reactivates across multiple spins. The use of a working copy of a dynamic wheel state table in conjunction with a static weighted table to control subsequent spin results provides a technical solution by providing an increasing award feature through use of these transient and static data structures while retaining the initial state of the "golden" weighted table (e.g., for subsequent game plays).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one display device configured to display an electronic game that includes a dynamic wheel feature;

a storage device storing a weighted table associated with the dynamic wheel feature of the electronic game; and at least one processor configured to execute instructions stored in at least one memory that, when executed, cause the at least one processor to:

activate the dynamic wheel feature based on an outcome of an instance of the electronic game, the activation includes displaying a wheel that includes a plurality of wheel sections, each wheel section identifies an award that may be awarded during a spin of the wheel;

display an initial spin of the wheel based on a first random number generated by a random number generator;

provide an initial award value for the initial spin of the wheel by identifying a first entry in the weighted table based on the first random number, the first entry indicating the initial award value;

determine to activate the dynamic wheel feature based on a second random number generated by the random number generator;

remove wheel sections from the displayed wheel that have award values that are less than or equal to the initial award value by displaying a burning animation that traverses circumferentially around the displayed wheel to designate each wheel section to be removed from the displayed wheel;

perform a second spin of the wheel based on a third random number generated by the random number generator; and provide a second award value by identifying a second entry in the weighted table based on the third random number and which has an associated award value that is greater than the initial award value.

2. The electronic gaming device of claim 1, wherein removing wheel sections from the displayed wheel further comprises:

displaying award values in wheel sections of the wheel having award values that are greater than the initial award value; and displaying no award values in wheel sections of the wheel having award values that are less than or equal to the initial award value.

3. The electronic gaming device of claim 1, wherein removing wheel sections from the displayed wheel further comprises displaying a section burning animation for each wheel section that has an associated award value less than a highest achieved section, thereby displaying removal by burning away of one or more wheel sections.

4. The electronic gaming device of claim 3, wherein removing wheel sections from the displayed wheel by burning away further comprises displaying the burning animation along a circumferential wheel portion starting adjacent to an awarded section of the wheel and traversing around the circumferential wheel portion, wherein displaying the section burning animation for each wheel section further includes starting the section burning animation for each wheel section when the burning animation of the circumferential wheel portion passes the associated wheel section.

5. The electronic gaming device of claim 1, wherein the storage device further stores a bonus spin weighted table that defines weighted probabilities for achieving an additional wheel spin based on a number of already awarded spins, wherein the instructions are further configured to cause the at least one processor to determine, after resolution of a particular wheel spin, to activate the dynamic wheel feature and award an additional wheel spin based on the bonus spin weighted table.

6. The electronic gaming device of claim 1, wherein removing wheel sections from the displayed wheel further includes removing entries from the weighted table that are less than or equal to the initial award value.

7. The electronic gaming device of claim 1, wherein performing a second spin of the wheel based on a third random number further includes:

generating an interim random number using the random number generator;

identifying an interim section of the wheel based on the weighted table and the interim random number;

discarding the interim random number and identified interim section when an associated award value of the interim section is less than or equal to the initial award value; and using the interim random number as the third random number and the associated award value of the interim section as the second award value when the associated award value of the interim section is greater than the initial award value.

8. A method of providing an electronic game with a dynamic wheel feature, the method comprising:

activating, by at least one processor, the dynamic wheel feature based on an outcome of an instance of the electronic game, the activation includes displaying a wheel at a display device that includes a plurality of wheel sections, each wheel section identifies an award that may be awarded during a spin of the wheel;

displaying, at the display device, an initial spin of the wheel based on a first random number generated by a random number generator;

providing, by the at least one processor, an initial award value for the initial spin of the wheel by identifying a first entry in a weighted table based on the first random number, the first entry indicating the initial award value;

determining, by the at least one processor, to activate the dynamic wheel feature based on a second random number generated by the random number generator;

removing, by the at least one processor, wheel sections from the displayed wheel that have award values that are less than or equal to the initial award value by displaying, at the display device, a burning animation that traverses circumferentially around the displayed wheel to designate each wheel section to be removed from the displayed wheel;

performing, by the at least one processor, a second spin of the wheel based on a third random number generated by the random number generator; and providing, by the at least one processor, a second award value by identifying a second entry in the weighted table based on the third random number and which has an associated award value that is greater than the initial award value.

9. The method of claim 8, wherein removing wheel sections from the displayed wheel further comprises:

displaying, at the display device, award values in wheel sections of the wheel having award values that are greater than the initial award value; and displaying, at the display device, no award values in wheel sections of the wheel having award values that are less than or equal to the initial award value.

10. The method of claim 8, wherein removing wheel sections from the displayed wheel further comprises displaying a section burning animation for each wheel section that has an associated award value less than a highest achieved section, thereby displaying removal by burning away of one or more wheel sections.

11. The method of claim 10, wherein removing wheel sections from the displayed wheel by burning away further comprises displaying the burning animation along a circumferential wheel portion starting adjacent to an awarded section of the wheel and traversing around the circumferential wheel portion, wherein displaying the section burning animation for each wheel section further includes starting the section burning animation for each wheel section when the burning animation of the circumferential wheel portion passes the associated wheel section.

12. The method of claim 8, further comprising determining, by the at least one processor and after resolution of a particular wheel spin, to activate the dynamic wheel feature and award an additional wheel spin based on a bonus spin weighted table, wherein the bonus spin weighted table defines weighted probabilities for achieving an additional wheel spin based on a number of already awarded spins.

13. The method of claim 8, wherein removing wheel sections from the displayed wheel further includes removing entries from the weighted table that are less than or equal to the initial award value.

14. The method of claim 8, wherein performing a second spin of the wheel based on a third random number further includes:

generating an interim random number using the random number generator;

identifying, by the at least one processor, an interim section of the wheel based on the weighted table and the interim random number;

discarding, by the at least one processor, the interim random number and identified interim section when an associated award value of the interim section is less than or equal to the initial award value; and using the interim random number as the third random number and the associated award value of the interim section as the second award value when the associated award value of the interim section is greater than the initial award value.

15. A non-transitory computer readable medium storing instructions that, when executed by at least one processor, cause at least one processor to:

activate a dynamic wheel feature based on an outcome of an instance of an electronic game, the activation includes displaying a wheel that includes a plurality of wheel sections, each wheel section identifies an award that may be awarded during a spin of the wheel;

display an initial spin of the wheel based on a first random number generated by a random number generator;

provide an initial award value for the initial spin of the wheel by identifying a first entry in a weighted table based on the first random number, the first entry indicating the initial award value;

determine to activate the dynamic wheel feature based on a second random number generated by the random number generator;

remove wheel sections from the displayed wheel that have award values that are less than or equal to the initial award value by displaying a burning animation that traverses circumferentially around the displayed wheel to designate each wheel section to be removed from the displayed wheel;

perform a second spin of the wheel based on a third random number generated by the random number generator; and provide a second award value by identifying a second entry in the weighted table based on the third random number and which has an associated award value that is greater than the initial award value.

16. The non-transitory computer readable medium of claim 15, wherein removing wheel sections from the displayed wheel further comprises:

displaying award values in wheel sections of the wheel having award values that are greater than the initial award value; and displaying no award values in wheel sections of the wheel having award values that are less than or equal to the initial award value.

17. The non-transitory computer readable medium of claim 15, wherein removing wheel sections from the displayed wheel further comprises displaying a section burning animation for each wheel section that has an associated award value less than a highest achieved section, thereby displaying removal by burning away of one or more wheel sections, wherein removing wheel sections from the displayed wheel by burning away further comprises displaying the burning animation along a circumferential wheel portion starting adjacent to an awarded section of the wheel and traversing around the circumferential wheel portion, wherein displaying the section burning animation for each wheel section further includes starting the section burning animation for each wheel section when the burning animation of the circumferential wheel portion passes the associated wheel section.

18. The non-transitory computer readable medium of claim 15, wherein the instructions further cause the at least one processor to determine, after resolution of a particular wheel spin, to activate the dynamic wheel feature and award an additional wheel spin based on a bonus spin weighted table, wherein the bonus spin weighted table defines weighted probabilities for achieving an additional wheel spin based on a number of already awarded spins.

19. The non-transitory computer readable medium of claim 15, wherein removing wheel sections from the displayed wheel further includes removing entries from the weighted table that are less than or equal to the initial award value.

20. The non-transitory computer readable medium of claim 15, wherein performing a second spin of the wheel based on a third random number further includes:

generating an interim random number using the random number generator;

identifying an interim section of the wheel based on the weighted table and the interim random number;

discarding the interim random number and identified interim section when an associated award value of the interim section is less than or equal to the initial award value; and using the interim random number as the third random number and the associated award value of the interim section as the second award value when the associated award value of the interim section is greater than the initial award value.

* * * * *